June 11, 1935.  F. LANG  2,004,631
DIESEL ENGINE
Filed March 20, 1933
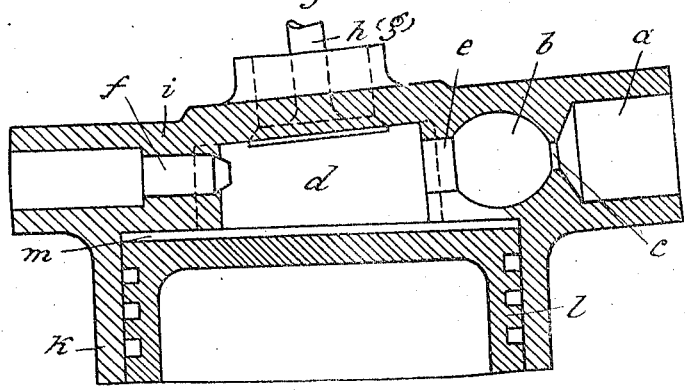
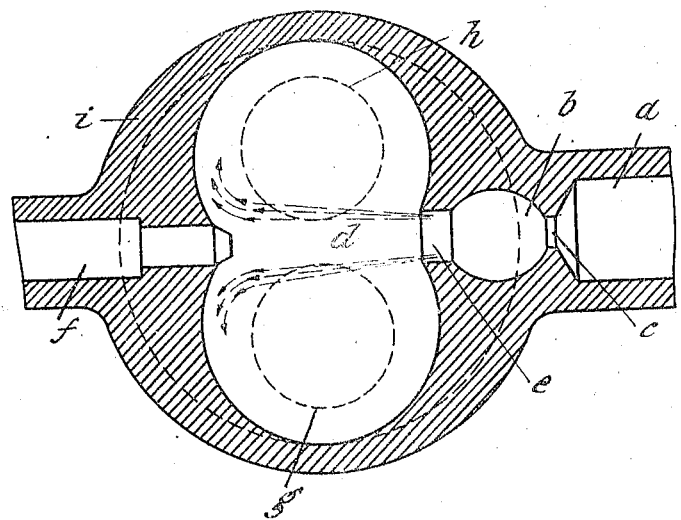
Inventor
Franz Lang
By Brown, Jackson, Boettcher & Dienner
Attys Patented June 11, 1935

2,004,631

UNITED STATES PATENT OFFICE 2,004,631

DIESEL ENGINE

Franz Lang, Munich, Germany, assignor to Lanova Aktiengesellschaft, Vaduz, Liechtenstein Application March 20, 1933, Serial No. 661,731
In Germany September 7, 1931

5 Claims. (Cl. 123—32)

This invention relates to injection internal combustion engines, and has to do with engines employing air storage chambers in which air is stored under pressure during the compression stroke of the piston and from which the stored air is ejected during the working stroke of the piston.

My invention is directed to a novel arrangement and relation of combustion chamber, fuel injection nozzle and air storage chamber features designed to produce increased efficiency and smoothness in operation of the engine, and is particularly suitable for use in Diesel engines operating with medium compression of the fuel mixture charge. Further objects and advantages of my invention will appear from the detail description.

In the drawing:—

Figure 1 is an axial sectional view through the outer end of a cylinder of an engine embodying my invention, parts being shown in elevation and parts being broken away; and Figure 2 is a transverse sectional view taken substantially in the plane of the axis of the fuel injection nozzle, parts being broken away and parts being shown in elevation.

In the embodiment of my invention illustrated by way of example, the engine comprises a cylinder $k$, cylinder head $i$ and a piston $l$ operating in the cylinder. Head $i$ is provided, in its under side, with a combustion chamber $d$ of approximately figure 8 shape in plan and comprising a constriction and lobes at opposite sides thereof, this chamber overlying and opening downward into the cylinder. The head $i$ is further provided, through the top thereof, with an inlet passage and an exhaust passage, controlled by the valves $g$ and $h$, respectively. A fuel injection nozzle $f$ is suitably mounted in head $i$ and opens into combustion chamber $d$ at one side of the constriction thereof, this nozzle being disposed to inject fuel into the combustion chamber and toward the opposite side of the constriction of the latter.

An outer main air storage chamber $a$ is disposed at the opposite side of head $i$ from nozzle $f$. Chamber $a$ communicates, at its inner end, with the outer end of an inner ante-chamber $b$, through a restricted orifice $c$, and is of materially greater capacity than chamber $b$. The ante-chamber is shown as of approximately spheroidal shape, but may be of any other suitable shape, and communicates at its inner end with combustion chamber $d$, through a restricted orifice $e$ materially larger than orifice $c$. Orifices $c$ and $e$ are aligned with each other and with nozzle $f$, these orifices and the nozzle preferably being coaxial.

When piston $l$ is in its upper or outer dead center position, shown in Figure 1, slight clearance $m$ is left between the upper face of the piston and the cylinder roof. During the compression stroke of the piston, the displaced air flows into the ante-chamber $b$ and thence through orifice $c$ into the main air storage chamber $a$. As the piston approaches outer dead center position, fuel is injected through nozzle $f$, and a portion of this injected fuel flows with the air into chambers $b$ and $a$, in which the air and fuel are stored under high pressure. Ignition of the fuel charge occurs when the piston is at or about its outer dead center position, and injection of fuel continues during predetermined travel of the piston on its working stroke away from the cylinder head.

As the piston moves downward, the contents of chamber $b$ are discharged through orifice $e$ in a stream and in opposition to the stream of fuel injected from nozzle $f$. The entering stream of fuel is broken up and atomized by the opposed air and fuel stream ejected through orifice $e$, and the resulting air and fuel mixture is split by the tip of the nozzle and the adjacent portion of the wall of the combustion chamber, so as to be separated into two streams which flow in opposite directions from the nozzle and about the adjacent curved walls of the lobes of the combustion chamber, as indicated in Figure 2. In this manner, definite and controlled rotary turbulence is imparted to the fuel mixture within the combustion chamber and the cylinder, and thorough and intimate commingling of the fuel particles and the air is assured, which contributes to smoothness and efficiency in operation of the engine.

When the air from chamber $a$ enters chamber $b$, through the restricted orifice $c$, it expands in the latter chamber so that the pressure obtaining in chamber $b$ is materially lower than the pressure in chamber $a$. In this manner the pressure under which the air and fuel are ejected through orifice $e$ into the combustion chamber is lowered, relative to the pressure in chamber $a$ and sufficiently to avoid too violent discharge of the contents of chambers $a$ and $b$ into combustion chamber $d$, while prolonging the period of this discharge and assuring that air will be delivered from the storage chambers into the combustion space in the continued downward travel of the piston accompanied by expansion of the burning fuel mixture charge, which assures more uniform combustion and increased smoothness in operation.

It will be understood that suitable means, known in the art, is provided for supplying fuel under pressure to the injection nozzle in an appropriate manner and for operating the inlet and exhaust valves in properly timed relation.

What I claim is:

1. In an injection engine, a cylinder and a piston operating therein, a combustion chamber overlying and opening into the cylinder, an injection nozzle at one side of the combustion chamber and disposed to inject fuel thereinto substantially normal to the cylinder axis, an inner air storage chamber opening into the combustion chamber at the other side thereof through a restricted orifice, and an outer air storage chamber communicating with said inner chamber through a restricted orifice materially smaller than the orifice between the inner chamber and said combustion chamber.

2. In an injection engine, a cylinder and a piston operating therein, a combustion chamber overlying and opening into the cylinder, an injection nozzle at one side of the combustion chamber and disposed to inject fuel thereinto substantially normal to the cylinder axis, an inner air storage chamber opening into the combustion chamber at the other side thereof through a restricted orifice, and an outer air storage chamber communicating with said inner chamber through a restricted orifice materially smaller than the orifice between the inner chamber and said combustion chamber, said outer storage chamber being of materially greater capacity than said inner chamber.

3. In an injection engine, a cylinder and a piston operating therein, a combustion chamber overlying and opening into the cylinder and having a surrounding wall curved in a plane normal to the cylinder axis, an injection nozzle at one side of the combustion chamber and disposed to inject fuel thereinto substantially normal to the cylinder axis, an inner air storage chamber opening into the combustion chamber at the other side thereof through a restricted orifice aligned with said nozzle, and an outer air storage chamber communicating with said inner chamber through a restricted orifice smaller than the orifice between the inner chamber and said combustion chamber.

4. In an injection engine, a cylinder and a piston operating therein, a combustion chamber overlying and opening downward into the cylinder in unrestricted communication therewith for free flow of the fuel mixture and the hot products of combustion downward into the cylinder, an injection nozzle at one side of the combustion chamber and disposed to inject fuel thereinto substantially normal to the cylinder axis, an inner air storage chamber opening at its inner end into the combustion chamber through a restricted orifice, and an outer main air storage chamber opening at its inner end into the outer end of said inner chamber through a restricted orifice of materially less length and cross-sectional area than the orifice opening from the inner air storage chamber into the combustion chamber, said main air storage being of materially greater capacity than the inner air storage chamber and said orifices being opposed to and coaxial with the injection nozzle.

5. In an injection engine, a cylinder and a piston operating therein, a combustion chamber overlying and opening downward into the cylinder in unrestricted communication therewith for free flow of the fuel mixture and the hot products of combustion downward into the cylinder, an injection nozzle at one side of the combustion chamber and disposed to inject fuel thereinto substantially normal to the cylinder axis, an inner air storage chamber at the other side thereof opening into the combustion chamber through a restricted orifice, and an outer main air storage chamber of materially greater capacity than said inner chamber and opening into the latter through a restricted orifice, said orifices being so related that the flow of air from the main air storage chamber into said inner chamber is materially more restricted than the flow of air from said inner chamber into said combustion chamber.

FRANZ LANG.